(12) United States Patent
Ono et al.

(10) Patent No.: US 6,501,718 B1
(45) Date of Patent: Dec. 31, 2002

(54) DISK, RECORDING AND REPRODUCTION APPARATUS, AND RECORDING AND REPRODUCTION METHOD

(75) Inventors: Hiroaki Ono, Mito (JP); Shigemitsu Higuchi, Fujisawa (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/483,093

(22) Filed: Jan. 14, 2000

(30) Foreign Application Priority Data

Jan. 18, 1999 (JP) .......................................... 11-008832

(51) Int. Cl.[7] .............................................. G11B 7/00
(52) U.S. Cl. ........................ 369/53.2; 369/14; 369/52.1; 369/273
(58) Field of Search .............................. 369/52.1, 53.2, 369/53.37, 75.1, 14, 273

(56) References Cited

U.S. PATENT DOCUMENTS

| | | | | |
|---|---|---|---|---|
| 5,134,602 A | * | 7/1992 | Baca et al. | 369/44.27 |
| 5,267,097 A | * | 11/1993 | Ogino et al. | 360/49 |
| 5,434,737 A | * | 7/1995 | Miura | 360/133 |
| 5,689,715 A | * | 11/1997 | Crump et al. | 395/750 |
| 5,940,363 A | * | 8/1999 | Ro et al. | 369/273 |
| 6,044,046 A | * | 3/2000 | Diezman et al. | 369/14 |
| 6,134,205 A | * | 10/2000 | Watanabe | 369/77.1 |
| 6,411,590 B1 | * | 6/2002 | Yoshida et al. | 369/184 |

FOREIGN PATENT DOCUMENTS

| | | | | |
|---|---|---|---|---|
| EP | A 1 0 230069 | * | 12/1986 | 19/8 |
| WO | WO 97/41562 | * | 11/1997 | |

* cited by examiner

Primary Examiner—W. R. Young
Assistant Examiner—Gautam R. Patel
(74) Attorney, Agent, or Firm—Townsend and Townsend and Crew LLP

(57) ABSTRACT

Transfer of ancillary information, typically related to main information stored on an optical disk, to or from a storage on a disk is performed before the disk is capable of reproducing information. Described is a disk fitting aid member arranged in a recording and reproduction apparatus. Reproduction or recording of management information or catalog information for main information recorded or to be recorded is triggered by the operation of the fitting aid member. Alternatively, a recording and reproduction apparatus is mounted with a disk detector, with which the mounting of the disk on a tray can be detected, and the recording and reproduction of information to or from the storage is triggered by this detection.

13 Claims, 4 Drawing Sheets

DISK, RECORDING AND REPRODUCTION APPARATUS, AND RECORDING AND REPRODUCTION METHOD

BACKGROUND OF THE INVENTION

The present invention relates to an optical disk and a recording and reproduction apparatus for use with it, and more particularly to an optical disk having on a part of the disk a recording and reproduction unit differing from the optical disk recording medium to permit early reading of information by the recording and reproduction apparatus.

In recent years, various systems using mass producible and highly reliable optical disks as the recording and reproduction medium have become commercially available. Typical examples include compact disks (CD) which are optical disks for music, digital video disks (DVD) which are optical disks for movies or video and other audiovisual material, and CD-ROMs and DVD-ROMs for use on a computer for application software, game software and various data recording. There also are optical disk-based writable or rewritable optical recording media such as MOs, CD-Rs, CD-RWs, DVD-RAMs and DVD-RWs for backup recording of personal and business information.

Any of these optical disk media becomes capable of recording and reproduction only when it is loaded into a recording and reproduction apparatus and, after the disk is revolving at a prescribed speed of revolution, an optical head moves to a prescribed recording or reproducing position. Therefore, before recording or reproduction is started, revolution control to accelerate to the prescribed speed and control of seeking, focusing and tracking are necessary to bring the optical head to the prescribed position, all of which requires considerable time. These troublesome control procedures are necessary before actual reproduction or recording, even if it is desired only to reproduce or record contents recorded or to be recorded on the disk, such as disk management information or catalog information.

The configuration of such optical disks as CDs, CD-ROMs, DVDs and DVD-ROMs, which are manufactured by the molding of plastic sheets, permits data-recorded disks to be available at low cost, but they are read only disks which allow no subsequent recording of data on them. It is therefore difficult or impossible to process data on the disk and record the result of the processing on the disk for storage, or to record and store the number of times the disk has been used. Accordingly such disks are inconvenient when it is desired to record the result of a game or the like, or to use them for an information management system to limit the use of application software, or to limit the number of times musical or audiovisual information is played back.

It is possible to form a rewritable recording medium on a part of the disk and provide storage for record management information there, but recording requires an optical head of a higher quality than that of a playback only apparatus, resulting in a more expensive recording and reproduction apparatus. Furthermore, even if the disk is made of a rewritable recording medium, there remains the aforementioned disadvantage that disk management information cannot be read or written until the disk attains the desired speed of revolution.

For backup recording of personal or business information, there are writable or rewritable optical recording media using an optical disk such as MO, CD-R, CD-RW, DVD-RAM or DVD-RW. Even with such a recording disk, however, the user must have the disk spinning and, after carrying out prescribed controls, read the catalog information on the disk to check the information recorded. Therefore, for the user to identify the recorded contents, he or she has to take the trouble of writing the recorded contents on the label, or use the disk and wait until the information becomes readable.

On the other hand, one way to accomplish information management and content checking of main information on media other than that for the recording of main information, there is a system by which, for instance, a semiconductor memory is mounted on a magnetic tape cartridge and information management and content checking for the magnetic tape is accomplished with that semiconductor memory. In this case, however, because the semiconductor memory is disposed in the cartridge body, accessing data in the semiconductor memory is carried out by bringing the semiconductor memory into direct contact with a sensor. Therefore, although it is possible to apply this system and mount, for instance, a semiconductor memory on the disk, the method of information transfer is difficult to design because the semiconductor memory itself also will be spinning.

Furthermore, even such information as could be immediately found upon insertion of a disk into a player, if the disk is contained in a cartridge for recording-inhibited (REC inhibit) information or the like, by manipulating a mechanical switch provided as part of a cartridge, information can only be known after the disk has undergone revolution control if it is a bare disk, not contained in a cartridge.

SUMMARY OF THE INVENTION

An object of the present invention is to provide an optical disk, together with a recording and reproduction apparatus for using it. In a preferred embodiment of this system, the disk is a low cost playback only optical disk for recording a large quantity of data, manufactured by molding a plastic sheet, such as a CD, CD-ROM, DVD or DVD-ROM. The disk permits subsequent recording of management information and reproduction of the recorded management information for use with an information management system with information recorded on the disk. This does not allow recording of additional information, such as a game, application software, music, video, movie or the like. It does, however, permit recording, for example, to store results of a game, to limit the use of the application software, or to restrict the number of times the music or video information etc. is played back. Another object of the invention is to provide an optical disk, together with a recording and reproduction apparatus for using it, which enables the user, for backup recording of personal information, to easily check what information its recorded on a rewritable optical recording medium using an optical disk such as MO, CD-R, CD-RW, DVD-RAM or DVD-RW. The invention makes it possible to achieve these objects by mounting a storage device (herein often "storage") for recording management information and catalog information on a part of the optical disk, and to easily and reliably record or reproduce the management information and catalog information enabling checking of the information before the disk begins to revolve.

To provide these benefits, in a preferred embodiment of the invention, the storage is mounted on or within the optical disk, to provide a recording medium for recording management or catalog information regarding the main information. Typically an integrated circuit (IC) chip formed by, for instance, a semiconductor process or the like is used for this additional storage. Further, the storage has, in addition, a signal processing unit for subjecting management information for the main stored information, and catalog information transferred from outside the disk, to signal processing, thereby converting them into data to be recorded. A memory unit is provided for recording the data to be recorded, as is a built-in controller for instructing and managing the recording, reproduction. For example, according to the contents of information, the storage can assist in judging and managing the way the main information is used by limiting the number of times the main information is reproduced. Also, because the IC chip is a circuit formed by a semiconductor process, an electromagnetic coupler can be either built into, or arranged adjacent to, the IC chip as a means to supply power to the circuits within the IC. Alternatively, the electromagnetic coupler can be arranged on the disc in a circular or spiral shape.

The chip further typically includes a built-in rectifier for converting the received signals into DC electrical power. As a means to communicate the management information between the optical disk and the recording and reproduction apparatus, an electromagnetic coupler, such as an antenna, can be either built into or arranged adjacently as a transmitter and receiver. Alternatively, it can be arranged on the disc in one or more turns in a circular or spiral shape.

As part of the recording/reproducing apparatus, there is also provided a communication unit for performing transmission/reception with the storage with an electromagnetic coupler. The communication unit is mounted with a transmitter/receiver for recording/reproducing the management information and catalog information stored on the disk.

To accomplish recording or reproduction of information to or from the storage before the disk revolves, a tray or a fitting aid member such as a disk holding member, is arranged on a disk turning device in the recording and reproducing apparatus. This enables the user to readily mount the disk and have information recorded into or reproduced from the storage. This process can be triggered by the opening/closing mechanism or by a disk loading mechanism for pulling the fitting aid member out of the recording and reproduction apparatus. Thus, as soon as the tray on which the disk is placed, or the disk holding member is pulled out, power supply to the disk is started on the basis of the information. After the storage on the disk becomes ready to record or reproduce, the management information and catalog information for the main information recorded on the storage is reproduced or recorded. During this time, the disk itself is placed on the tray, and the pulled out tray is inserted into the recording and reproduction apparatus by the disk loading mechanism to place the disk on a turntable.

Then, after the disk is clamped for rotation, a motor spins the disk, focusing and tracking control is performed, and the information is recorded into or reproduced from the recording medium. During the aforementioned control period, the management information or catalog data written in the storage are conveyed to the recording and reproduction apparatus or to the user. Using this information, according to its contents, before the servo controls are completed, the recording and reproduction apparatus or the user can determine that the disk does not permit recording, or other control information can be communicated to the user who can eject the disk or take other action. Alternatively, if it is a playback-restricted disk, the system can update the number of times the disk is permitted to be played, resulting in improved operational capability.

Whereas the foregoing description refers to a method by which recording and reproduction of information in the storage on the disk is triggered by the start of the operation of the disk loading mechanism, an alternative method has a disk detector mounted in a prescribed position on the pulled-out tray or in a prescribed position in the recording and reproduction apparatus. The disk detector detects the mounting of the disk on the tray, its insertion into the recording and reproduction apparatus or the mounting of the disk on the turntable, and this detection triggers the start of information flow into or from the storage. As this method ensures that the start of transfer of information into or from the storage follows the secure mounting of the disk by the user, the electric connection between the recording and reproduction apparatus and the storage is reliably accomplished.

DESCRIPTION OF THE SPECIFIC EMBODIMENTS

Figure 1:
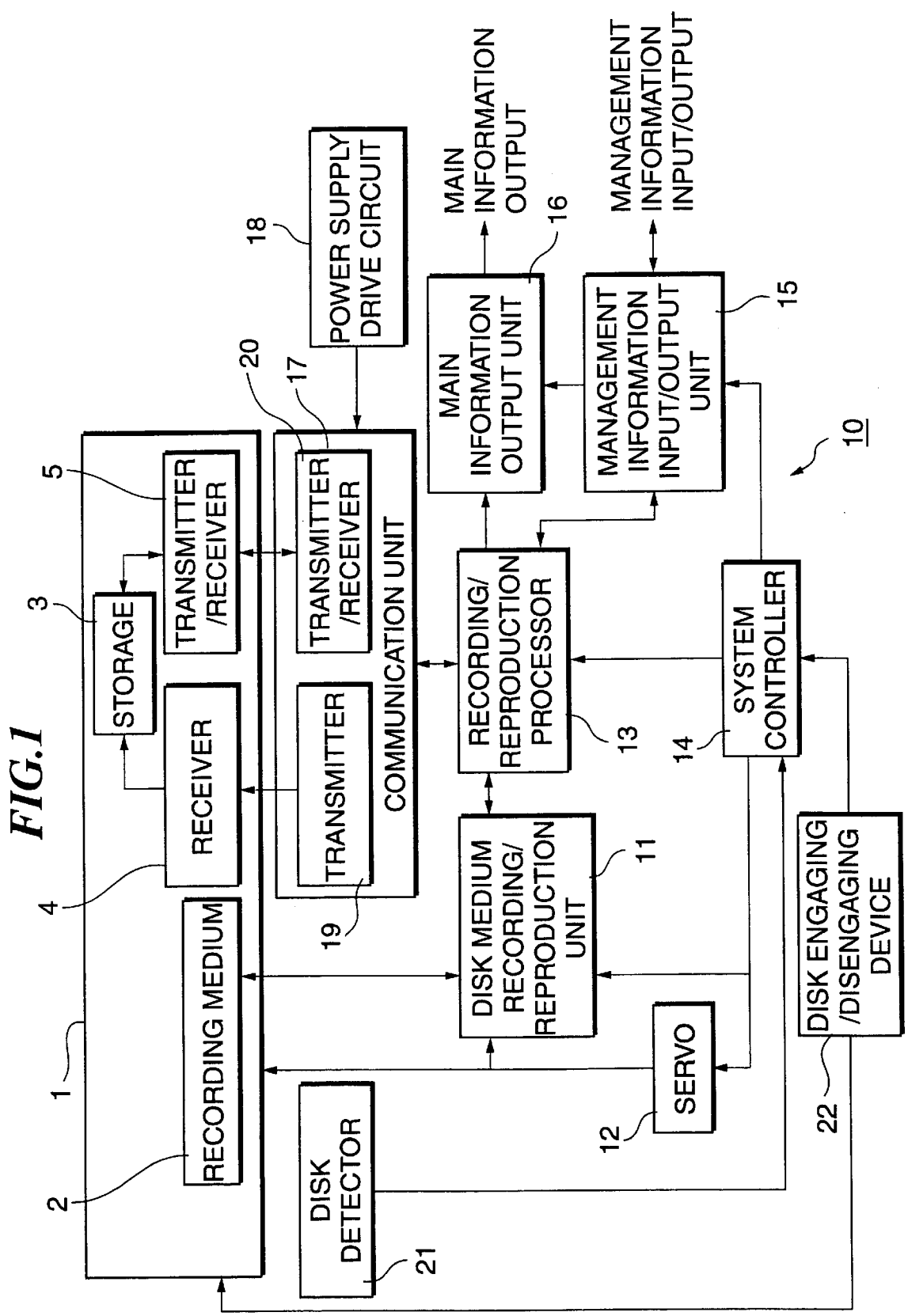
FIG. 1, illustrating one preferred embodiment of the present invention, is a system block diagram of an optical disk and a recording and reproduction apparatus.

An optical disk storing what is termed here "main information," and a recording and reproduction apparatus according to the present invention has, mounted in or on the optical disk, a storage for managing the main information. Preferably, the storage is in the form of an IC chip which is in addition to the recording medium in which the main information is recorded. FIG. 1 is a diagram illustrating the system configuration of a recording and reproduction apparatus 10 and a disk 1 according to the invention.

Below, we first describe the configuration within the disk 1. Disk 1 has a recording medium 2 for recording main information and a storage 3 for managing the main information. The storage 3 includes a signal processing unit for subjecting management information transferred from outside the disk to signal processing to convert it into data to be recorded. It also includes a memory unit for recording the data, and a built-in controller for instructing and managing the recording and reproduction, and according to the contents of information, managing main information. Also, because the IC chip is a circuit formed by a semiconductor process, a receiver 4 formed of an electromagnetic coupler, such as an antenna, can be built into the disk 1 or the IC as a means to supply driving power to the IC. Further, the receiver 4 includes a rectifier for rectifying signals received by the receiver to provide a power source. Similarly, as a means to communicate the management information between the optical disk and the recording and reproduction apparatus 10, an electromagnetic coupler, such as an antenna, is built in as a transmitter/receiver 5. By configuring these elements into a single IC chip, the cost of the storage element is reduced.

Next is shown a system configuration diagram of a recording and reproduction apparatus 20. The overall system includes a disk medium recording and reproduction unit 11, a servo 12, a recording and reproduction processor 13, a system controller 14, a management information input/output unit 15, a main information output unit 16, a communication unit 17, a power supply drive circuit 18, and a disk detector 21. The above-mentioned recording and reproduction apparatus 10 consists of these basic elements.

Each block shown in FIG. 1 is described below. The recording medium 2 on the disk 1 may be a playback only optical disk, such as a CD, CD-ROM, DVD or DVD-ROM, on which is recorded, for instance, application software, data, game software, music, video or the like. Or it may be an unwritable or rewritable optical recording medium, such as an MO, CD-R, CD-RW, DVD-RAM or DVD-RW on which similar information is recorded. The storage 3 preferably consists of an IC chip, or similar device, prepared by a semiconductor process intended for recording management information, catalog information or the like for the main information. The disk medium recording and reproduction unit 11 independently records or reproduces information to or from the recording medium and, if the recording medium 2 is an optical disk, includes an optical head.

The recording and reproduction processor 13, in reproducing main information, for example, subjects the reproduced information sent from the disk medium recording and reproduction unit 11 to extension, removal of error codes, demodulation or other processing, and delivers the processed information to the main information output unit 16. Alternatively, to transfer information from the management information input/output unit 15 to, for instance, the storage, it subjects the management information to compression, addition of error correction codes, modulation or other processing, and then transfers it to the storage.

The storage, preferably an IC memory chip, requires a power supply. The power supply is provided by the power supply drive circuit 18 via the communication unit 17 to the disk 1. The servo 12 performs control depending upon the disk type recording medium 2 for stable recording and reproduction operation. It can be implemented with a spindle motor, an actuator and a seek servo mechanism.

The storage band of signals to be transferred to the communication unit 17 for the recording and reproduction of the management information and power supply is usually outside the recording band of the main information so as not to affect the recording and reproduction of the main information.

Disk detector 21 senses mounting of the disk 1 into the apparatus, and according to this sensed information, the start timing for the power supply to the storage or for recording and reproduction is determined. Further, a disk engaging/disengaging device 22 is an opening/closing mechanism or a loading mechanism for inserting or removing the disk from the recording and reproduction apparatus. It usually consists of a tray, an arm or the like.

The constituent elements of the above-described recording and reproduction apparatus are controlled by the system controller 14.

Figure 2:
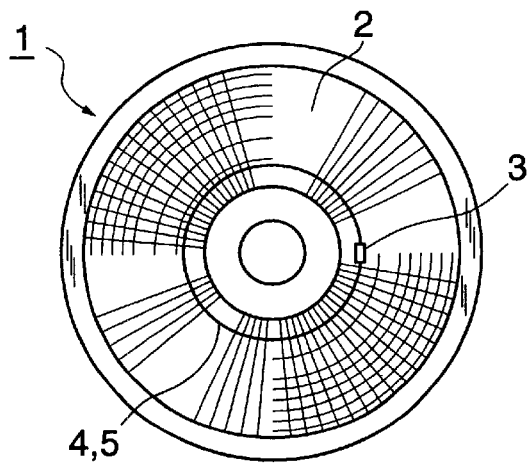
FIG. 2, illustrating a preferred embodiment of the invention, is a structural diagram of the optical disk.

FIG. 2 is a schematic structural diagram of the optical disk 1 according to an embodiment of the invention. Recording medium 2, storage 3, receiver and transmitter/receiver 4, 5 are shown. The receiver and transmitter/receiver supply power from the recording and reproduction apparatus side to the storage or communicate information between the storage and the recording and reproduction apparatus.

Figure 3A:
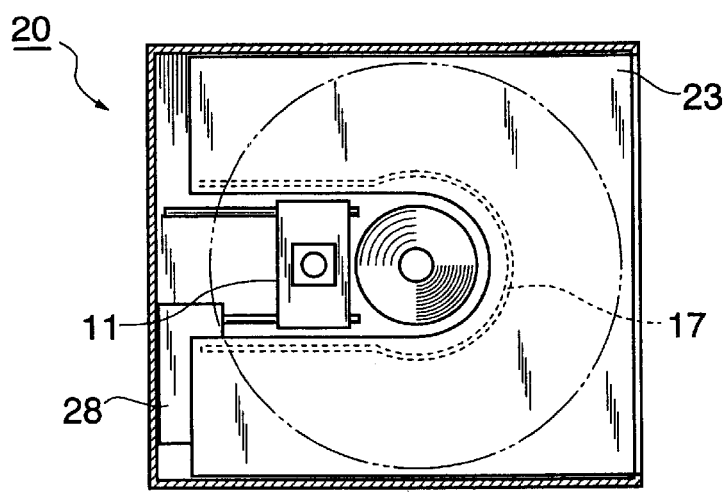
FIG. 3, illustrating a preferred embodiment of the invention, is a schematic diagram of the recording and reproduction apparatus.
Figure 3B:
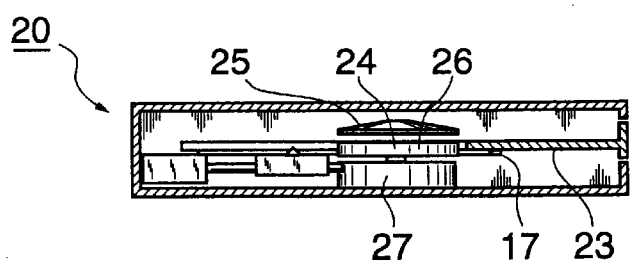

FIGS. 3A and 3B are schematic structural diagrams of the recording and reproduction apparatus 20 according to the invention. The disk medium recording and reproduction unit 11 performs recording and reproduction to or from the recording medium on the disk. For optical recording, its constituent elements are well known and include a laser light source, a detector for detecting reflected light, and an actuator for focusing or tracking a prescribed position on the disk. Also, the disk medium recording and reproduction unit 11 can be shifted by a seek mechanism 28 to a desired position on the disk. A communication unit 17 performs recording and reproduction, and provides a power supply to, the storage on the disk. A tray 23 is an example of a fitting aid member.

The user places the disk on the tray which is subsequently inserted into the recording and reproduction apparatus by the loading mechanism. The communication unit 17 is arranged in a part of the fitting aid member 23, and inserted by the loading mechanism into the recording and reproduction apparatus 10 together with the disk 1. The inserted disk is mounted on a turntable 24. After the disk is clamped with a damper 25 to prevent the disk from being displaced, it is turned by a spindle motor 27.

Figure 4A:
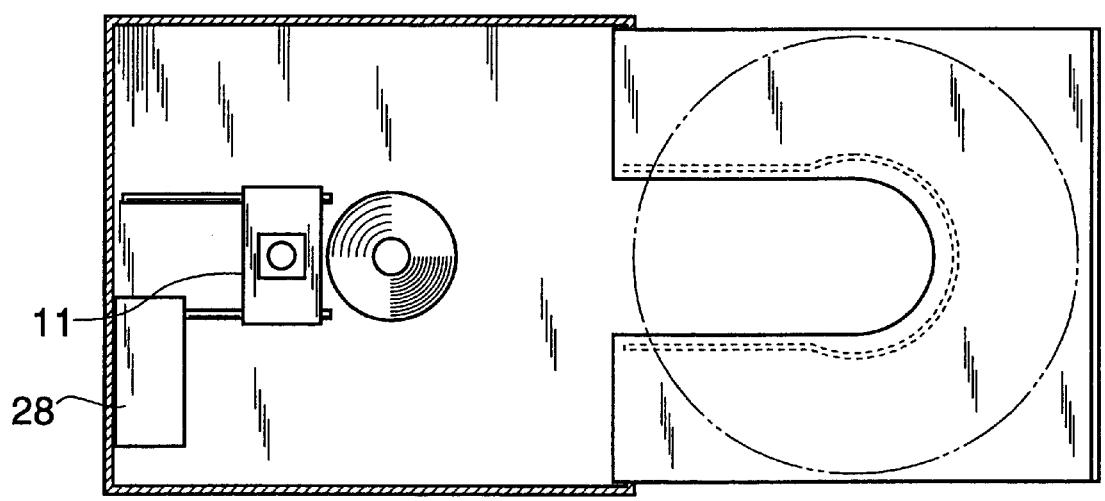
FIG. 4, illustrating another preferred embodiment of the invention, is a schematic diagram of a recording and reproduction apparatus.
Figure 4B:
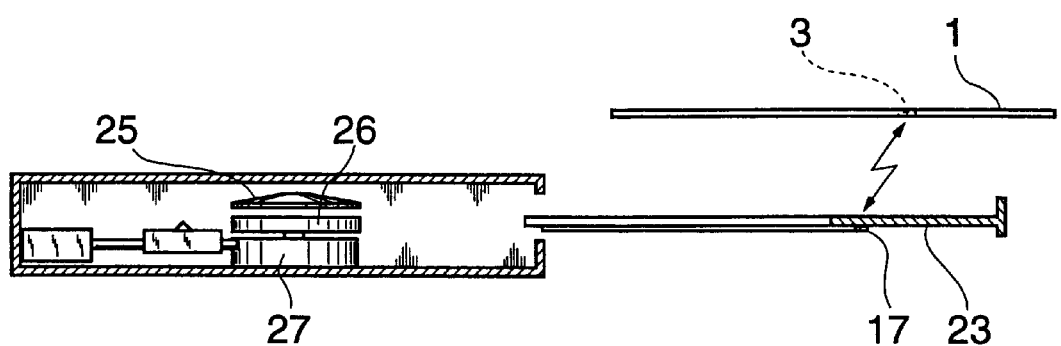

FIGS. 4A and 4B are diagrams illustrating a method according to the invention by which recording and reproduction of information to or from the storage is performed before the disk starts turning. The recording and reproduction apparatus 10, at the request of the user, moves the tray 23 out of the apparatus with the opening/closing mechanism, and the disk loading mechanism, so that the user can mount the disk 1 into the recording and reproduction apparatus. Then, triggered by the operation of the opening/closing mechanism, and the disk loading mechanism, the tray 23 moves into the recording and reproduction apparatus. Then recording and reproduction of information to or from the storage 3 is performed. Thus, about at the same time as the tray on which is placed disk 1 is moved out, the power supply is triggered. After the storage on the disk is enabled to record or reproduce, the management information and/or catalog information recorded or to be recorded in the storage 3 is reproduced or recorded. During that time, the disk 1 itself is placed on the tray 23 by the user, and the pulled out tray is inserted into the recording and reproduction apparatus 10 by the disk loading mechanism, thereby placing the disk on the mounting face 26 of the turntable. Then, after the disk 1 is clamped with the damper 25, the disk begins spinning and the information is recorded into or reproduced from the recording medium 2.

During this controlled period, so that the recording and reproduction of information can be stably accomplished between the storage 3 on the disk and the communication unit 17 in the recording and reproduction apparatus 10, the communication unit 17 is built into the tray 23. This enables information transfer and communication beginning at about the same time. After that the disk starts revolving. If communication is to also take place during this revolution, at least part of a transmitter 19 and the transmitter/receiver 20 of the communication unit 17, or part of the receiver 4 and of the transmitter/receiver 5, can be arranged in a circular or spiral manner. Because the management information and catalog information in the storage are communicated to the recording and reproduction apparatus or the user before recording and reproduction to or from the recording medium, the recording and reproduction apparatus or the user can take appropriate action, for example, ejecting the disk if recording is not permitted. Alternatively, if it is a playback-restricted disk, the system can update the number of times the disk is permitted to be played back, before the servo-based control over the disk is completed.

Although the foregoing description referred to a loading mechanism in which the disk is placed on a tray when it is to be loaded, the mechanism is not confined to this arrangement. Instead, for instance, the disk may be inserted and ejected by only an opening/closing mechanism without a tray, or by a CD jukebox system. In this case, the start of the operation of the opening/closing mechanism, or the play mechanism. may trigger the action to record to or reproduce from the storage.

Figure 5A:
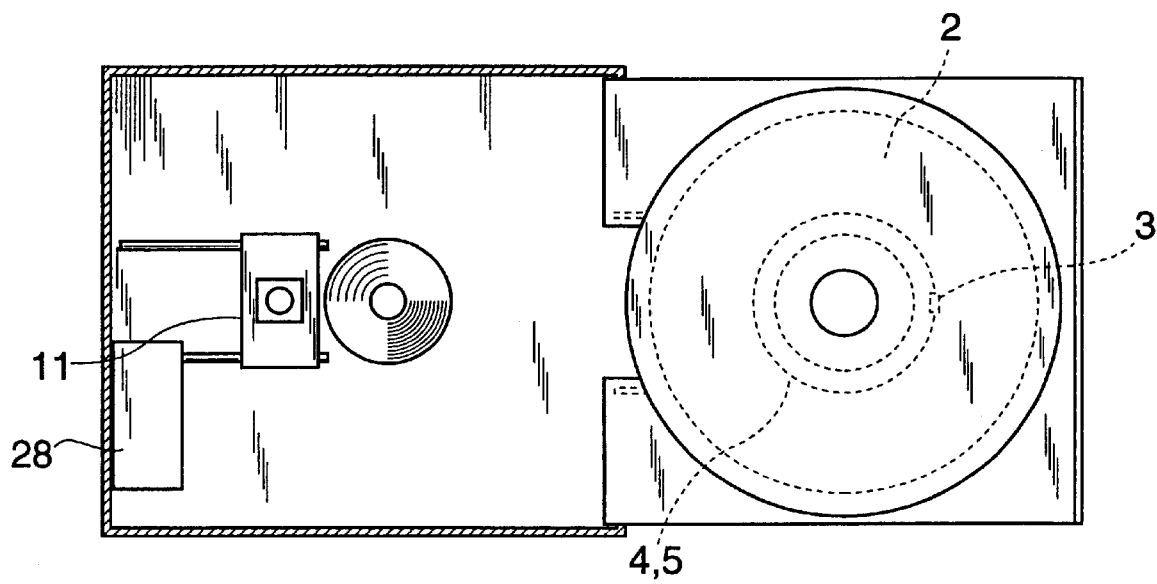
FIG. 5, illustrating still another preferred embodiment of the invention, is a schematic diagram of a recording and reproduction apparatus.
Figure 5B:
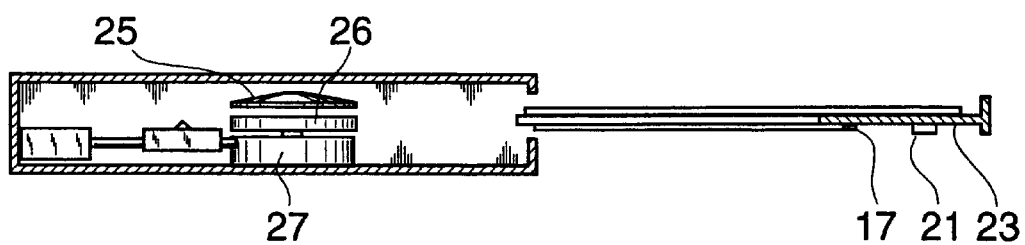

Another embodiment is described with reference to FIGS. 5A and 5B. As illustrated in FIG. 5B, a disk detector 21 to detect the placement of a disk 1 on a tray 23 is provided in a part of the pulled out tray 23. The disk detector 21, as it turns after the disk is placed, preferably is a non-contact type device, such as a photosensor. The disk detector 21 is mounted in a prescribed position on the tray 23 or in a prescribed position within the recording and reproduction apparatus, and detects the mounting of the disk on the tray or insertion of a disk into the recording and reproduction apparatus. Thus triggered, the recording and reproduction of information to or from the storage is started.

Alternatively, detection of the disk on a turntable 24 triggers the start of the transfer of information to or from the storage. In this case, a communication unit 17 for communication to the storage on the disk is provided on the tray 23 part of the recording and reproduction apparatus. This method ensures that the transfer of information to or from the storage in response to a detection signal from the disk detector follows the secure mounting of the disk by the user, making the electric connection between the recording and reproduction apparatus and the storage more reliable.

Further, while in the foregoing embodiments the recording and reproduction of information to or from the storage on the disk is started before the disk begins to turn, the transfer of information to or from the storage on the disk may also start after the disk begins to turn. This occurs if the disk medium recording and reproduction unit starts before the disk reaches its required speed of revolution for the main recording medium on the disk. Thus, to permit the disk medium recording and reproduction unit to transfer information to or from the storage on the recording medium, focusing and tracking control are required. This, however, makes possible recording and reproduction to or from the storage without delay.

If it is determined that the disk medium is a CD or a DVD before performing focusing and tracking control, information can be reproduced from, or written into, the storage during or before the determination. Quicker operation can be achieved, however, by having the storage store the disk type information and then reproduce that disk type information before performing focusing and tracking control. This eliminates the need for the recording and reproduction unit to determine the disk type.

According to an embodiment of the present invention, the optical disk and the recording and reproduction apparatus are mounted within the optical disk with a storage for recording management information and/or catalog information for the main information. A communication unit for recording or reproducing information to or from the storage is provided on the recording and reproduction apparatus side. To record or reproduce information to or from the storage before the disk starts turning, a disk tuning device within the recording and reproduction apparatus is provided with a fitting aid member so that the user can easily mount the disk. The transfer of management information and catalog information for the main information recorded or to be recorded is triggered by the operation of the opening/closing mechanism and the disk loading mechanism moving the fitting aid member out of the recording and reproduction apparatus.

During this time, the disk itself records or reproduces information to or from the recording medium after undergoing revolution, focusing and tracking control. Therefore, the management information and/or catalog information written in the storage on the disk are conveyed to the apparatus or the user sooner. Thus, according to their contents, before the servo controls on the disk are completed, the recording and reproduction apparatus or the user can communicate whether the disk permits recording. Thus the user can eject the disk or, if it is a playback-restricted disk, can update the number of times it is permitted to be played back and play back the disk.

Furthermore, a disk detector can be mounted in a prescribed position on the tray or in a prescribed position in the recording and reproduction apparatus. The disk detector detects the mounting of the disk on the tray or its insertion into the recording and reproduction apparatus, and this detection triggers the start of the transfer of information to or from the storage. As this method ensures that the start of the transfer of information to or from the storage follows the secure mounting of the disk by the user, the electric connection between the recording and reproduction apparatus and the storage is more reliable.

The preceding has been a description of the preferred embodiment of the invention. It will be appreciated that deviations and modifications can be made without departing from the scope of the invention, which is defined by the appended claims.

What is claimed is:

1. A method for transferring information to or from a recording medium in a first position on a disk and a storage arranged in a second position on the disk comprising:

transferring information to or from the recording medium while the disk is turning;

detecting placement of the disk on a tray having an extended position and a retracted position;

starting transfer of information to or from the storage upon detecting placement of the disk on the tray; and transferring information to or from the storage while the disk is not turning with the tray in either the extended position or the retracted position, wherein information can be transferred with the disk whether the disk is turning or not turning.

2. The method of claim 1 wherein the transferring of information to or from the recording medium is performed based on information contained in the storage.

3. A recording and reproduction apparatus comprising:

a turning device for turning a disk having a recording medium arranged in a circular or spiral shape in a prescribed position and a storage arranged in another prescribed position;

a first device for transfer of information to or from the recording medium which device operates in a state in which the disk is turning;

a second device for transfer of information to or from the storage before the disk is turning sufficiently to allow transfer of information with the first device; and a tray device having an extended position for receiving the disk and a retracted position;

wherein the second device is coupled to the tray device and is configured to transfer information to or from the storage with the tray device in either the extended position or the retracted position.

4. The recording and reproduction apparatus as in claim 3, wherein the storage is capable of transferring information before the disk is fitted into a disk mounting position on the turning device.

5. The recording and reproduction apparatus as in claim 3, further comprising a disk detector for detecting fitting of the disk to the recording and reproduction apparatus, and wherein the transfer of information to or from the storage is started in response to a signal from the disk detector.

6. The recording and reproduction apparatus as in claim 3, wherein transfer of information to or from the storage is performed before transfer to or from the recording medium is started.

7. The recording and reproduction apparatus as in claim 3, further comprising a fitting aid member for fitting the disk into a disk mounting position on the turning device, and wherein the transfer of information to or from the storage is triggered by start of an action of the fitting aid member to fit the disk.

8. The recording and reproduction apparatus as in claim 3 further including a receiving mechanism for changeably receiving one of a plurality of disks.

9. The recording and reproduction apparatus as in claim 3 further comprising a detection device coupled to the tray device for triggering the second device to start transfer of information to or from the storage upon detection of placement of the disk on the tray device.

10. The recording and reproduction apparatus as in claim 9 wherein the detection device is a photosensor.

11. The recording and reproduction apparatus as in claim 3 further comprising an opening-closing mechanism for extending and retracting the tray device and upon triggering retraction of the tray device triggering the second device to start transfer of information to or from the storage.

12. The recording and reproduction apparatus as in claim 3 wherein the prescribed position of the storage is within the prescribed position of the recording medium.

13. A system for transferring information to or from a disk, the system comprising:
   a disk having a recording medium arranged in a circular or spiral shape in a first prescribed position and a storage in a second prescribed position;
   a turning device for turning the disk;
   a first device for transfer of information to or from the recording medium which operates in a state in which the disk is turning;
   a second device for transfer of information to or from the storage which operates in a state in which the disk is either not turning, not turning sufficiently to allow transfer of information with the first device, or turning sufficiently to allow transfer of information with the first device; and
   a tray device having an extended position for receiving the disk and a retracted position,
   wherein the second device is coupled to the tray device and is configured to transfer information to or from the storage with the tray device in either the extended position or the retracted position.

* * * * *